(12) United States Patent
Lai et al.

(10) Patent No.: US 9,253,504 B2
(45) Date of Patent: Feb. 2, 2016

(54) METHODS AND APPARATUS FOR ADAPTIVE REFERENCE FILTERING

(75) Inventors: Po-Lin Lai, Los Angeles, CA (US); Yeping Su, Vancouver, WA (US); Peng Yin, West Windsor, NJ (US); Cristina Gomila, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1266 days.

(21) Appl. No.: 12/309,058

(22) PCT Filed: Jul. 5, 2007

(86) PCT No.: PCT/US2007/015680
§ 371 (c)(1),
(2), (4) Date: Jan. 5, 2009

(87) PCT Pub. No.: WO2008/010929
PCT Pub. Date: Jan. 24, 2008

(65) Prior Publication Data
US 2009/0290637 A1    Nov. 26, 2009

Related U.S. Application Data

(60) Provisional application No. 60/807,645, filed on Jul. 18, 2006.

(51) Int. Cl.
*H04N 7/00* (2011.01)
*H04N 19/573* (2014.01)
(Continued)

(52) U.S. Cl.
CPC ........... *H04N 19/573* (2014.11); *H04N 19/105* (2014.11); *H04N 19/117* (2014.11);
(Continued)

(58) Field of Classification Search
USPC ...................................... 375/240.02
See application file for complete search history.

(56) References Cited

U.S. PATENT DOCUMENTS

2002/0150299 A1 * 10/2002 Miller ....................... G01J 3/26
                                                       382/211
2003/0152284 A1 *  8/2003 Ferguson .................. G06T 5/20
                                                       382/274
(Continued)

FOREIGN PATENT DOCUMENTS

EP     1 641 274     3/2006
JP     2006135376    5/2006

OTHER PUBLICATIONS

Bouman et al.: "Cluster: An Unsupervised Algorithm for Modeling Gaussian Mixtures", [Online] Jul. 1, 2005, Retrieved on Jan. 10, 2008, pp. 14-20, XP002464224.
(Continued)

*Primary Examiner* — Joseph P Hirl
*Assistant Examiner* — Sayed Beheshti Shirazi
(74) *Attorney, Agent, or Firm* — Robert D. Shedd; Paul P. Kiel; Xiaoan Lu

(57) ABSTRACT

There are provided methods and apparatus for adaptive reference filtering. An apparatus includes an encoder for encoding at least one picture. The encoder performs adaptive filtering of at least one reference picture to respectively obtain at least one filtered reference picture, and predictively codes the at least one picture using the at least one filtered reference picture. The at least one reference picture is a picture wherein at least one sample thereof is used for inter-prediction either of subsequent to the at least one sample being applied to an in-loop filter or in an absence of the at least one sample being applied to an in-loop filter.

43 Claims, 4 Drawing Sheets

(51) Int. Cl.
| | |
|---|---|
| *H04N 19/597* | (2014.01) |
| *H04N 19/105* | (2014.01) |
| *H04N 19/196* | (2014.01) |
| *H04N 19/61* | (2014.01) |
| *H04N 19/117* | (2014.01) |
| *H04N 19/137* | (2014.01) |
| *H04N 19/17* | (2014.01) |
| *H04N 19/82* | (2014.01) |

(52) U.S. Cl.
CPC .............. *H04N19/137* (2014.11); *H04N 19/17* (2014.11); *H04N 19/196* (2014.11); *H04N 19/597* (2014.11); *H04N 19/61* (2014.11); *H04N 19/82* (2014.11)

(56) References Cited

U.S. PATENT DOCUMENTS

| | | | | |
|---|---|---|---|---|
| 2006/0093039 | A1* | 5/2006 | Yasuda | H04N 19/196 375/240.16 |
| 2006/0114997 | A1* | 6/2006 | Lelescu | H04N 19/105 375/240.16 |
| 2006/0291557 | A1* | 12/2006 | Tourapis | H04N 19/46 375/240.12 |
| 2007/0002947 | A1* | 1/2007 | Lu | G06T 9/004 375/240.12 |
| 2007/0064804 | A1* | 3/2007 | Paniconi | H04N 19/56 375/240.16 |
| 2009/0022220 | A1* | 1/2009 | Vatis | H04N 19/176 375/240.12 |

OTHER PUBLICATIONS

Budagavi, "Video Compression Using Blur Compensation," Image Processing, ICIP 2005, IEEE International Conference in Genova, Italy, Sep. 11-14, 2005, Piscataway, NJ, pp. 882-885, XP010851195.

Ohm: "Submissions Received in CfP on Multiview Video Coding," International Organisation for Standandisation Organisation Internationale De Normalisation ISO/IEC JTC1/SC29/WG11 Coding of Moving Pictures and Audio, MPEG 2006/m12969, Jan. 2006.

Suhring et al.: "Unified Coding Style for the H.26L Reference Software", Heinrich Hertz Institute, File: coding_style.doc, May 22, 2007, pp. 1-5.

Wedi: "Adaptive Interpolation Filter for Motion Compensated Prediction," Institute of Communication Theory and Signal Processing, University of Hannover, Germany, 2002 IEEE, pp. II-509 to II-512.

Vatis et al.: "Prediction of P- and B-Frames Using a Two-dimensional Non-separable Adaptive Wiener Interpolation Filter for H.264/AVC," International Organisation for Standardisation Organisation Internationale Normalisation ISO/IEC JTC 1/SC 29/WG 11 Coding of Moving Pictures and Audio, M13113, Apr. 2006.

Vatis et al.: "Coding of Coefficients of Two-Dimensional Non-Separable Adaptive Wiener Interpolation Filter," 9 pgs.

Wedi: "Adaptive Interpolation Filters and High-Resolution Displacements for Video Coding", IEEE Transactions on Circuits and Systems for Video Technology, vol. 16, No. 4, Apr. 2006, XP-002464225.

Vatis et al.: "Motion- and Aliasing-Compensated Prediction Using a Two-Dimensional Non-Separable Adaptive Wiener Interpolation Filter," Image Processing, ICIP 2005, IEEE International Conference in Genova, Italy, Sep. 11-14, 2005, Piscataway, NJ, XP-002406855, pp. 894-897.

International Search Report, dated Feb. 15, 2008.

Wedi, T., "Advanced Motion Compensated Prediction Methods", ITU Study Group 16-Video Coding Experts Group—ISO/IEC MPEG & ITU-T VCEG (ISO/IEC JTC1/SC29/WG11 and ITU-T SG16 Q6), XX, XX, No. VCEG-X10, Oct. 29, 2004, XP030003427.

\* cited by examiner

METHODS AND APPARATUS FOR ADAPTIVE REFERENCE FILTERING

CROSS-REFERENCE TO RELATED APPLICATIONS

This application claims the benefit, under 35 U.S.C. §365 of International Application PCT/US2007/015680, filed Jul. 5, 2007 which was published in accordance with PCT Article 21(2) on Jan. 24, 2008 in English and which claims the benefit of U.S. provisional patent application No. 60/807,645 filed Jul. 18, 2006.

TECHNICAL FIELD

The present principles relate generally to video encoding and decoding and, more particularly, to methods and apparatus for adaptive reference filtering.

BACKGROUND

In current encoder and/or decoder designs, motion compensation is used to exploit temporal redundancy by subtracting a prediction block from the current block. However, there exist various situations in which the motion compensated prediction is not efficient. For example, one situation involves when there is a discrepancy of sharpness/blurriness between a current frame to be encoded and a reference frame. This may be caused by, for example, changing focus, camera pan with hand-held devices, and/or a special effect created for a scene change. Such phenomenon can often be observed in dramas when the camera is first focused on one character and then shifts its focus to another character when the two characters appear in different scene/focus depths. The first person looks sharper in the reference frame while the second person is blurred in the reference frame. Herein, we denote this focus-changing example in regular single-view video coding as "Case 1".

Another source of discrepancy that degrades the quality of the prediction signal appears in multi-view video sequences. In multi-view video coding systems, scenes are captured simultaneously by multiple cameras from different view points. Disparity compensation is applied from view to view to exploit the redundancy among different view pictures. Higher coding efficiency can be achieved by performing both motion and disparity compensations, as compared to encoding each view independently. Multi-view video systems may be built with heterogeneous cameras, or cameras that have not been perfectly calibrated. This leads to discrepancies such as, for example, illumination mismatch, color mismatch and/or focus mismatch among different views. The efficiency of cross-view disparity compensation may deteriorate due to such discrepancies. Furthermore, objects with different depths may possess different kinds of incongruity between two views. For example, object A in view 1 may be in focus while view 2 may be in focus with object B. To perform disparity compensation from view 1 to view 2, object A is sharper in the reference frame while object B is blurred. Herein, we denote such camera focus mismatch in multi-view systems as "Case 2".

Most of the previous literature on adaptive reference frame filtering is focused upon generating a sub-pixel reference for motion compensation.

For example, in one conventional adaptive interpolation filtering approach, an adaptive interpolation filter has been proposed on a frame basis. After obtaining the motion vectors using an interpolated reference frame with a fixed six-tap filter corresponding to the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"), the coefficients of the adaptive interpolation filter are calculated by minimizing a matching error measure such as sum of square difference (SSD) or sum of absolute difference (SAD). The adaptive filter is used to generate the interpolated reference picture, which is then used for motion compensation. The process does not carry out further motion estimation with the newly interpolated sub-pixel reference. The filter design is constrained to be separable in vertical and horizontal directions and is cascaded with bilinear filters.

In an improvement to the previously described adaptive interpolation filtering approach, another approach involves first obtaining the motion vectors with standard interpolation filters. Depending upon the sub-pixel portion of the motion vector, different interpolation filters are designed for different sub-pixel positions. The filters employed are two-dimensional non-separable, with certain symmetric constraints to reduce the number of coefficients to be solved. A second motion estimation/compensation is performed with these new filters to generate a sub-pixel reference.

In the above described prior art approaches relating to adaptive interpolation filtering, the integer pixels in the reference frame remain unchanged, as the interpolation keeps the original data points unchanged. However, such an approach may not be efficient for predictive video coding with inherent discrepancies.

In a prior art approach to video compression using blur compensation, it is proposed to use a blurring filter to generate a blurred reference frame. However, this approach is only directed to situations where the current frame is a blurred version of the reference frame, but not the reverse case. The set of filters that may be selected by the encoder are predefined, which is quite restrictive and suboptimal as compared to the adaptive filter design approach. Moreover, for each frame to be encoded, only one filter from the predefined set will be selected based on frame-level rate reduction.

SUMMARY

These and other drawbacks and disadvantages of the prior art are addressed by the present principles, which are directed to methods and apparatus for adaptive reference filtering.

According to an aspect of the present principles, there is provided an apparatus. The apparatus includes an encoder for encoding at least one picture. The encoder performs adaptive filtering of at least one reference picture to respectively obtain at least one filtered reference picture, and predictively codes the at least one picture using the at least one filtered reference picture. The at least one reference picture is a picture wherein at least one sample thereof is used for inter-prediction either of subsequent to the at least one sample being applied to an in-loop filter or in an absence of the at least one sample being applied to an in-loop filter.

According to another aspect of the present principles, there is provided a method. The method includes encoding at least one picture. The encoding step includes performing adaptive filtering of at least one reference picture to respectively obtain at least one filtered reference picture, and predictively coding the at least one picture using the at least one filtered reference picture. The at least one reference picture is a picture wherein at least one sample thereof is used for inter-prediction either of subsequent to the at least one sample being applied to an in-loop filter or in an absence of the at least one sample being applied to an in-loop filter.

According to yet another aspect of the present principles, there is provided an apparatus. The apparatus includes a decoder for decoding at least one picture. The decoder performs adaptive filtering of at least one reference picture to respectively obtain at least one filtered reference picture, and predictively decodes the at least one picture using the at least one filtered reference picture. The at least one reference picture is a picture wherein at least one sample thereof is used for inter-prediction either of subsequent to the at least one sample being applied to an in-loop filter or in an absence of the at least one sample being applied to an in-loop filter.

According to a still further aspect of the present principles, there is provided a method. The method includes decoding at least one picture. The decoding step includes performing adaptive filtering of at least one reference picture to respectively obtain at least one filtered reference picture, and predictively decoding the at least one picture using the at least one filtered reference picture. The at least one reference picture is a picture wherein at least one sample thereof is used for inter-prediction either of subsequent to the at least one sample being applied to an in-loop filter or in an absence of the at least one sample being applied to an in-loop filter.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
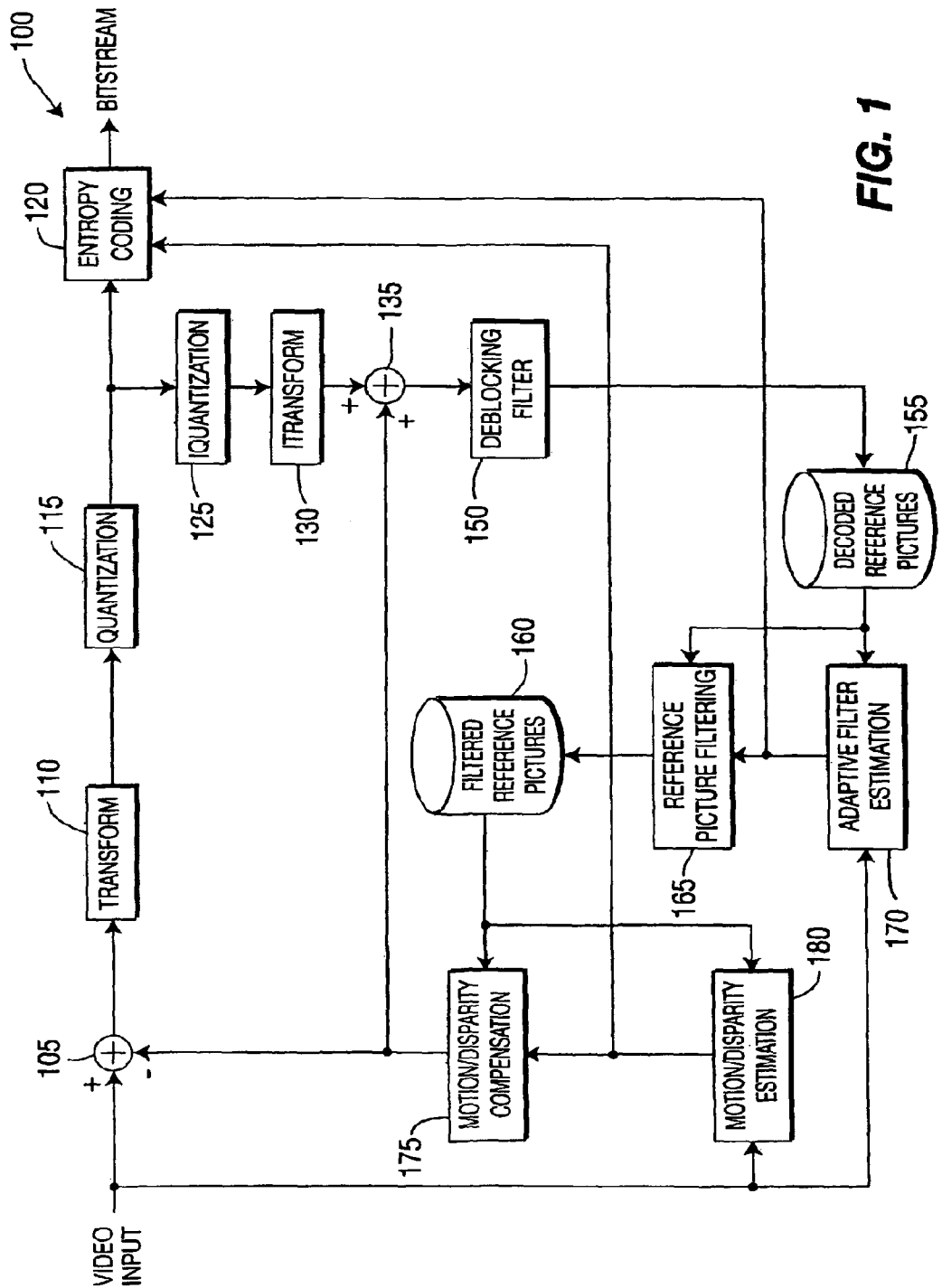
FIG. 1 is a block diagram for an exemplary Multi-view Video Coding (MVC) encoder with adaptive reference filtering, in accordance with an embodiment of the present principles.

The present principles are directed to methods and apparatus for adaptive reference filtering.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are Intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof in which motion and/or disparity compensation is applied, including extensions of the MPEG-4 AVC standard, while maintaining the spirit of the present principles.

As used herein, the term "reference picture" refers to a picture from which a sample is obtained for use for inter-prediction after (i.e., subsequent to) the sample is applied to an in-loop filter (such as, for example, a deblocking filter) or when no such in-loop filter is applied at all.

Turning to FIG. 1, an exemplary Multi-view Video Coding (MVC) encoder with adaptive reference filtering is indicated generally by the reference numeral 100. The encoder 100 includes a combiner 105 having an output connected in signal communication with an input of a transformer 110. An output of the transformer 110 is connected in signal communication with an input of quantizer 115. An output of the quantizer 115 is connected in signal communication with a first input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of a deblocking filter 150. An output of the deblocking filter 150 is connected in signal communication with an input of a decoded reference pictures store 155. An output of the decoded reference pictures store 155 is connected in signal communication with a first input of an adaptive filter estimator 170 and a first input of a reference picture filter 165. An output of the adaptive filter estimator 170 is connected in signal communication with a second input of the reference picture filter 165 and a third input of the entropy coder 120. An output of the reference picture filter 165 is connected in signal communication with an input of a filtered reference pictures store 160. An output of the filtered reference pictures store 160 is connected in signal communication with a first input of a motion/disparity compensator 175 and a first input of a motion/disparity estimator 180. An output of the motion/disparity estimator 180 is connected in signal communication with a second input of the motion/disparity compensator and a second input of the entropy coder 120. An output of the motion/disparity compensator 175 is connected in signal communication with an inverting input of the combiner 105 and a non-inverting input of the combiner 135. A non-inverting input of the combiner 105, a second input of the motion/disparity estimator 180, and a second input of the adaptive filter estimator 170 are available as inputs to the encoder 100. An output of the entropy coder 120 is available as an output to the encoder 100.

Figure 2:
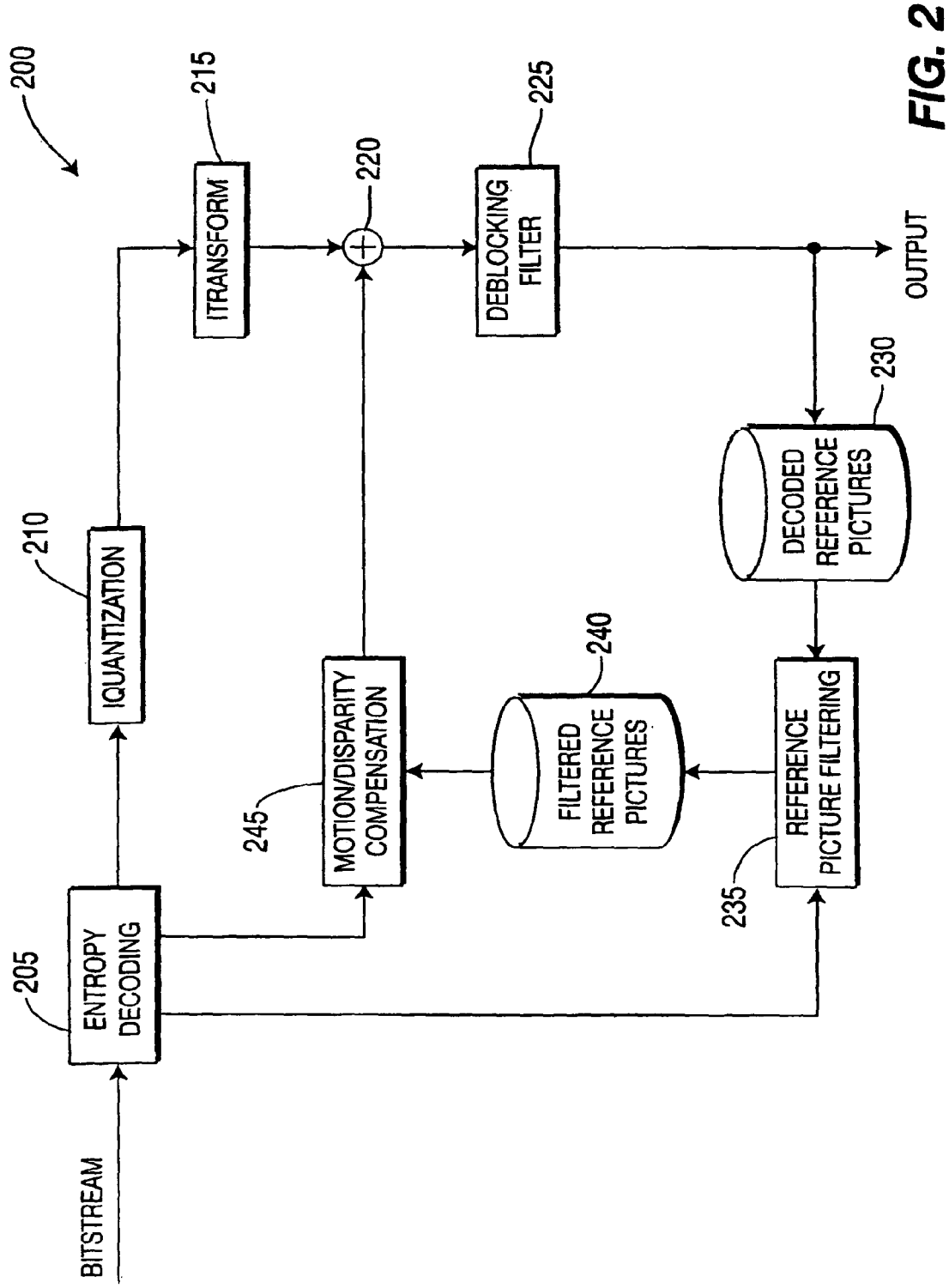
FIG. 2 is a block diagram for an exemplary Multi-view Video Coding (MVC) decoder with adaptive reference filtering, in accordance with an embodiment of the present principles.

Turning to FIG. 2, an exemplary Multi-view Video Coding (MVC) decoder with adaptive reference filtering is indicated generally by the reference numeral 200. The decoder 200 includes an entropy decoder 205 having a first output connected in signal communication with an input of an inverse quantizer 210. An output of the inverse quantizer 210 is connected in signal communication with an input of an inverse transformer 215. An output of the inverse transformer 215 is connected in signal communication with a first non-inverting input of a combiner 220. An output of the combiner 220 is connected in signal communication with an input of a deblocking filter 225. An output of the deblocking filter 225 is connected in signal communication with an input of a decoded reference pictures store 230. An output of the decoded reference pictures store 230 is connected in signal communication with a first input of a reference picture filter 235. An output of the reference picture filter 235 is connected in signal communication with an input of a filtered reference pictures store 240. An output of the filtered reference pictures store 240 is connected in signal communication with a first input of a motion/disparity compensator 245. An output of the motion/disparity compensator 245 is connected with a second non-inverting input of the combiner 220. A second output of the entropy decoder 205 is connected in signal communication with a second input of the reference picture filter 235. A third output of the entropy decoder 205 is connected in signal communication with a second input of the motion/disparity compensator 245. An input of the entropy decoder 205 is available as an input of the decoder 200. The output of the deblocking filter 225 is available as an output of the decoder 200.

In accordance with the present principles, a method and apparatus are provided for adaptive reference filtering. Advantageously, the method and apparatus disclosed herein provide a better prediction signal, for at least the reasons set forth herein below, for predictive video coding than prior art approaches to adaptive reference filtering.

In an embodiment, multiple filters are adaptively designed to address various mismatches in different portions of an image.

In an embodiment, based upon the current picture to be encoded and a reference picture, a set of filters are adaptively calculated to compensate for the discrepancies between these two pictures. The computed filters are then applied to the reference picture before it is used for prediction. For example, the filter operation is applied to the decoded reference pictures on the original sampling grid to generate filtered version of the reference picture. These filters operate in the way that new references with filtered pixels are generated to provide a better prediction for predictive video coding.

For example, filtering on the reference frame itself will be able to better compensate for discrepancies such as sharpness/blurriness mismatch. Also, since adaptive reference filtering is applied to the original image resolution, it has a computational advantage over adaptive interpolation filtering.

For a sub-pixel reference, two exemplary approaches are provided. One approach is to generate sub-pixel with the standard AVC interpolation filter, but based on the pixels from new reference picture obtained as above. The other approach is to also use adaptive filters to generate sub-pixel reference.

It is to be appreciated that the present principles may advantageously be applied to both motion compensated prediction in regular single-view video coding and disparity compensated prediction in Multi-view Video Coding (MVC). As one example in accordance with an embodiment of the present principles, we apply the scheme to cross-view prediction in Multi-view Video Coding, where the disparity information is used as a hint in determining the number of filters and in calculating the filter coefficients. This scheme may also be used to compensate the changing depth of field and/or changing blurriness in regular video coding.

Regarding the type of filter that may be used in accordance with the present principles, it is to be appreciated that while one or more embodiments of the present principles are described herein with respect to the use of Finite Impulse Response (FIR) linear filters, other types of filters including, but not limited to, Infinite Impulse Response (IIR) filters and nonlinear filters, may also be employed, while maintaining the spirit of the present principles. Moreover, it is to be appreciated that temporal methods can be considered in the design of the filter, such as three-dimensional filters that involve multiple decoded reference pictures.

After the adaptive filters are estimated, the actual filtering operation can be applied in a local basis on the fly during the motion/disparity compensation process, or the whole reference picture can be filtered first and stored before being used for compensation.

In an embodiment, during the encoding process, one or more filters are adaptively designed by clustering/segmentation algorithms to compensate for various mismatches in different portions of an image. Motion/disparity compensation can be performed with filtered reference frames. Filter coefficients for each frame and the selection of filters for each block within a given frame are transmitted to the decoder for correct reconstruction. The filter coefficients of our adaptive filters can be differentially coded for better efficiency. The reference pictures management method disclosed herein may be used to signal the block level filter selection. In a particular embodiment directed to the MPEG-4 AVC standard, the reference indexing mechanism corresponding thereto can be used for the purpose of signaling which filter to use for the coding of a particular block. As for the decoder, adaptive filters are produced with the received coefficients. Corresponding new references can then be generated to properly decode the video sequence.

In accordance with an embodiment, the adaptive filter estimation includes two steps, a filter association step and a filter determination step.

Regarding the filter association step, multiple filters are enabled for each reference picture in order to model various mismatches in different portions of an image. To that end, the current picture is segmented into several groups. Each group will be associated with one adaptive filter to be estimated later. The segmentation can be achieved based on a number of inputs. Exemplary inputs include, but are not limited to, motion information, disparity information, local signal characteristic, and the prediction signal characteristic. One particular embodiment of block segmentation for filter association is to separate the foreground from the background and then respectively associate the foreground and background with two filters. An optional post-processing step of the group portioning could be applied to improve the filter association results. For example, the filter association process could over-segment the image resulting in too many filters, which could be further clustered into a smaller number of filters in the optional post-processing step.

Regarding filter determination, for each sub-picture group derived from the previous (filter association) step, filter coefficients are calculated by minimizing a cost function for prediction errors. Only pixels associated with the current filter will be involved in the estimation process. The cost function could be any non-increasing function of the absolute pixel difference such as, for example, sum of squared difference (SSD) and/or sum of absolute difference (SAD).

Figure 3:
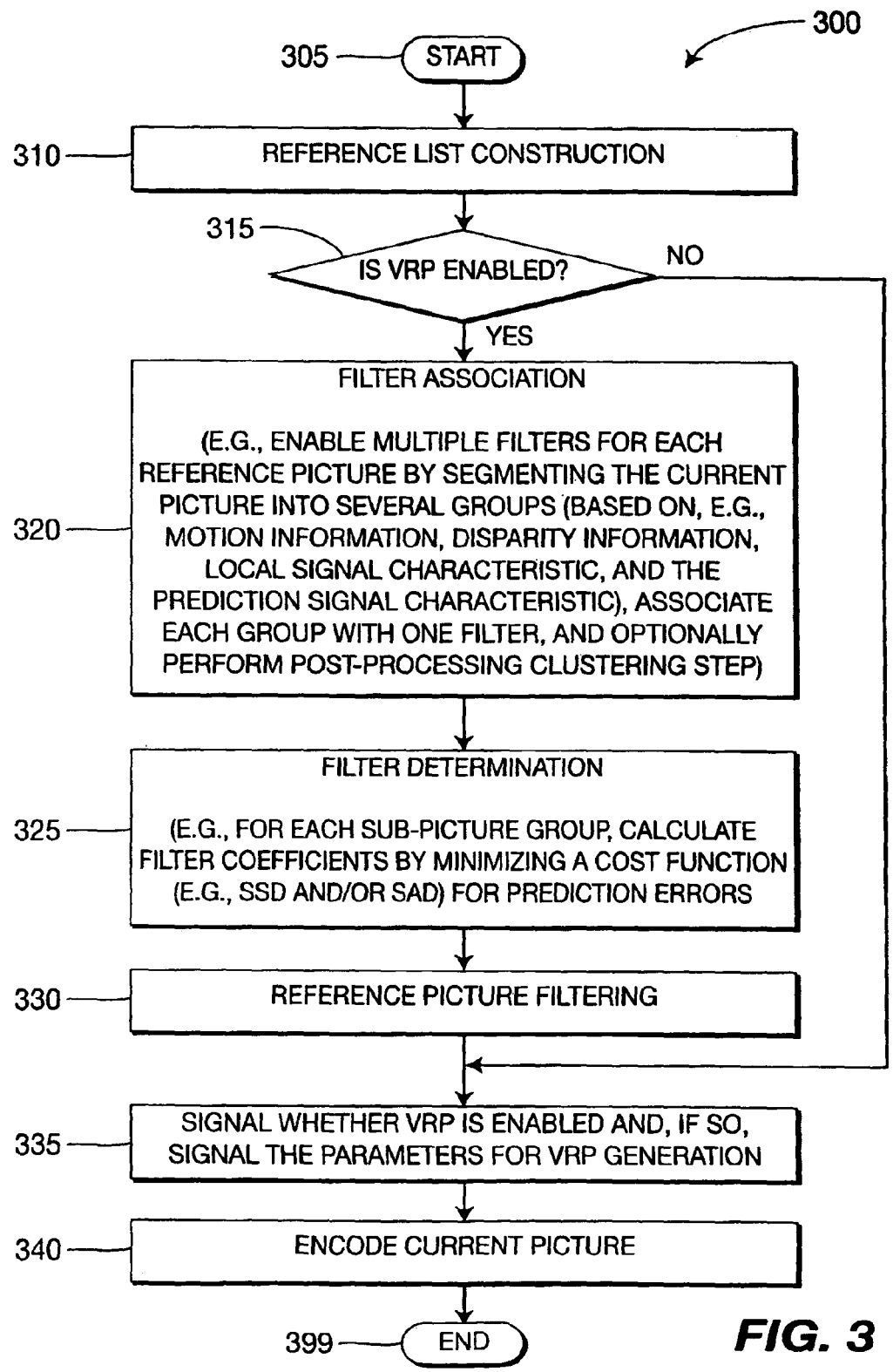
FIG. 3 is a flow diagram for an exemplary method for estimating adaptive filters at an encoder, in accordance with an embodiment of the present principles.

Turning to FIG. 3, an exemplary method for estimating adaptive filters at an encoder is indicated generally by the reference numeral 300.

The method 300 includes a start block 305 that passes control to a function block 310. The function block 310 performs reference list construction, and passes control to a decision block 315. The decision block 315 determines whether or not VRP is enabled. If so, then control is passed to a function block 320. Otherwise, control is passed to a function block 335.

The function block 320 performs filter association, and passes control to a function block 325. The function block 325 performs filter determination, and passes control to a function block 330. The function block 330 performs reference picture filtering, and passes control to a function block 335.

The function block 335 signals whether or not VRP is enabled and, if so, also signals the parameters for VRP generation, and then passes control to a function block 340. The function block 340 encodes the current picture, and passes control to an end block 399.

The filter association performed by the function block 320 may involve, for example, enabling multiple filters for each reference picture by segmenting the current picture into several groups (based on, e.g., motion information, disparity information, local signal characteristic, and the prediction signal characteristic), associating each group with one filter, and optionally performing a post-processing clustering step.

The filter determination performed the function block 325 may involve, for example, for each sub-picture group, calculating filter coefficients by minimizing a cost function (e.g., SSD and/or SAD) for prediction errors.

Figure 4:
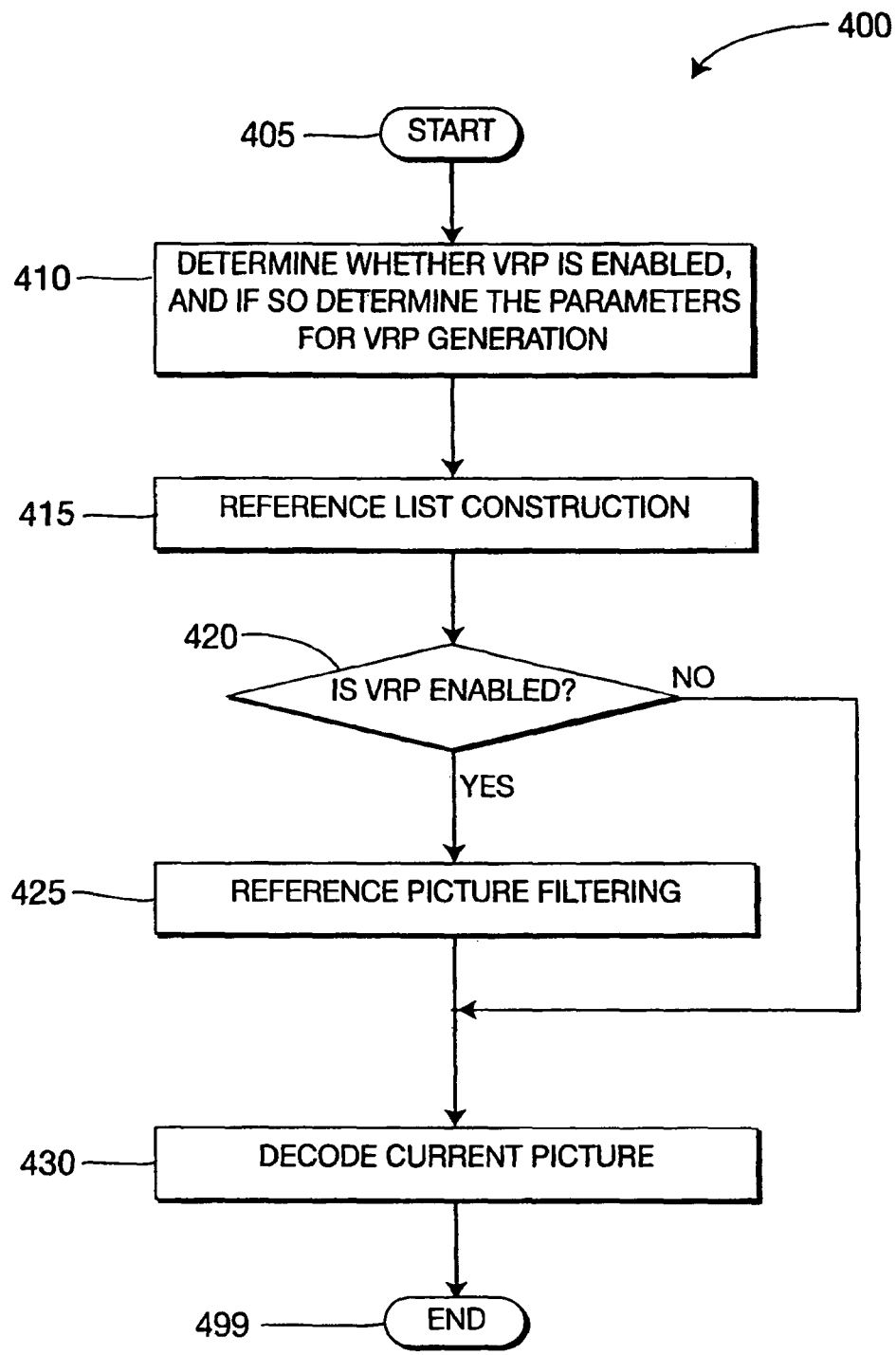
FIG. 4 is a flow diagram for an exemplary method for estimating adaptive filters at a decoder, in accordance with an embodiment of the present principles.

Turning to FIG. 4, an exemplary method for estimating adaptive filters at a decoder is indicated generally by the reference numeral 400.

The method 400 includes a start block 405 that passes control to a function block 410. The function block 410 determines whether VRP is enabled and, if so, determines the parameters for VRP generation, and then passes control to a function block 415. The function block 415 performs reference list construction, and passes control to a decision block 420. The decision block 420 determines whether or not VRP is enabled. If so, then control is passed to a function block 425. Otherwise, control is passed to a function block 430.

The function block 425 performs reference picture filtering, and passes control to the function block 430.

The function block 430 decodes the current picture, and passes control to an end block 499.

Adaptive Reference Filtering for Cross-View Prediction in MVC

The method and apparatus disclosed herein may be used in any video coding system with motion compensation and/or disparity compensation. In multi-view video coding (MVC), disparity compensation utilizes decoded pictures from other views to predict the current view picture. Heterogeneous and/or not perfectly calibrated cameras in multi-view video coding systems could potentially cause a higher amount of discrepancy between views. Furthermore, the degree and characteristic of mismatch might be different for different parts of the scene. For the focus mismatch problem described in Case 2 above, various sharpness/blurriness incongruity will appear for objects with different depths. In one embodiment directed to multi-view video coding, the disparity field can be exploited to adaptively design multiple filters.

As previously described, using multiple filters in reference filtering can compensate for various discrepancies for objects with different scene depths. For a pair of images from two views in a multi-view video coding system, objects closer to the cameras (shorter depth) will have a larger disparity, while objects farther away (longer depth) will have a smaller disparity. This property is used in an embodiment as one possible way to associate objects having different depths, which involves looking at their disparity and performing an association(s) in accordance with their relative disparity.

In an embodiment, we identify objects within different depth levels and then calculate filter coefficients for the various depth levels. With disparity information, we can use various approaches to identify the objects within the different depth levels and calculate the filter coefficients for the various depth levels. Unlike most of the prior art work in computer vision, where elaborate methods are used to find an accurate/smooth disparity map at a pixel-level, here we want to find some disparity ranges to classify objects into different depth groups. For the sake of simplicity and illustration, in an embodiment, we demonstrate a clustering method based on the x-component of the block-wise disparity vectors obtained from the initial disparity compensation. This method is suitable for multi-view systems with cameras arranged on the same horizontal line. For two-dimensional (2D) camera arrangements such as a camera array, the clustering may be extended to both x and y directions of the disparity vectors.

To achieve block segmentation using disparity vectors, in an embodiment, we propose a clustering approach using a Gaussian Mixture Model (GMM). An Expectation-Maximization algorithm (EM algorithm) may be applied to achieve GMM clustering. This method will model the histogram of the x-component of disparity vectors with multiple Gaussian distributions. It provides the mean, variance, and prior probability of each Gaussian component.

There are several advantages in using a Gaussian Mixture Model. Some of these advantages will now be described.

With respect to one advantage in using a Gaussian Mixture Model, disparity estimation/compensation in video coding is generally achieved by selecting the matching with the lowest rate-distortion cost. There exists the possibility that the obtained disparity vectors may not reflect the actual displacement of the objects. GMM has the ability to model these random noisy vectors into a Gaussian curve, typically with quite large variance and very small prior probability. Eliminating such Gaussian component from the mixture model allows the clustering to be more resistant to noise.

With respect to another advantage in using a Gaussian Mixture Model, with mean and variance specified for each Gaussian component, we can find intervals to map disparity vectors into different groups with higher confidence (for example, mean±one standard deviation).

With respect to yet another advantage in using a Gaussian Mixture Model, a Gaussian with larger variance could cover a range of disparity that is too large in that it overlaps with other sharper shaped Gaussians. This can be easily checked by looking at the locations of the means of different Gaussian components, combining the means with their variances and prior probabilities. The disparity range associated with each group can then be adjusted accordingly.

After disparity vectors are clustered into depth groups, multiple filters are then calculated based on image blocks associated with different groups. In an embodiment, this procedure involves, for each depth group $DG_i$, calculating a filter with coefficients $h_{ij}$ by minimizing the squared prediction error as follows:

$$\min_{h_{ij}} \left\{ \sum_{\forall (x,y) \in DGi} \left( C_{(x,y)} - \sum_{j=-n}^{j=n} \sum_{i=-m}^{i=m} h_{ij} \times \hat{R}_{(x+dx+i, y+dy+j)} \right)^2 \right\} \quad (1)$$

In Equation (1), C is the current frame to be encoded and $\hat{R}$ is the reconstructed reference frame. The subscript index represents pixel location. (dx, dy) is the integer portion of the initial disparity vector. Equation (1) can be solved by taking the derivative with respect to each $h_{ij}$.

In accordance with an embodiment, we use two-dimensional non-separable filters. However, it is to be appreciated that given the teachings of the present principles provided herein, one of ordinary skill in this and related arts will contemplate these and various other types of filters that may be used in accordance with the present principles, while maintaining the spirit of the present principles. The size and shape of two dimensional non-separable filters can easily be specified by changing the values of m and n. For example, with m=n=2, the filters will be squared 5×5 filters, in which their centers locate at the pixel to be filtered. They take the weighted sum of pixels within a (±2, ±2) window to filter the reference frame. It is to be noted that the filters are operating on the reference frame in the sense that the actual integer pixels are filtered to generate another version of the reference for disparity compensation.

With new references obtained by applying the adaptive filters, the second disparity compensation is performed. The disparity estimation then searches for the best matching from among multiple references generated by different filters. The filter coefficients may be differentially encoded for higher coding efficiency. Given two views from a multi-view video coding system, the inherent mismatch in these two cameras should not change rapidly in time. We can code the coefficients at a current time stamp differentially with the coefficients at a previous time stamp. As for signaling the block-based filter selection, the reference indexing mechanism can be used for an embodiment based on the MPEG-4 AVC standard.

Adaptive Filtering in Single-View Video Coding

For video with focus change, such as the previously described 'Case 1', in an embodiment, a local based design approach can be applied. Initially, multiple filters may be calculated locally for different portions of an image. Since motion may not provide sufficient information to identify different objects, we capture local effects when the partition is small enough. These filters can be further clustered together to form groups, where subsequently each group will compute its own filter using the corresponding signal blocks.

A description will now be given of some of the many attendant advantages/features of the present invention, some of which have been mentioned above. For example, one advantage/feature is an apparatus that includes an encoder for encoding at least one picture, wherein the encoder performs adaptive filtering of at least one reference picture to respectively obtain at least one filtered reference picture, and predictively codes the at least one picture using the at least one filtered reference picture. The at least one reference picture is a picture wherein at least one sample thereof is used for inter-prediction either of subsequent to the at least one sample being applied to an in-loop filter or in an absence of the at least one sample being applied to an in-loop filter.

Another advantage/feature is the apparatus having the encoder as described above, wherein the encoder adaptively determines at least one of filter coefficients and a number of filters to be applied to the at least one reference picture based upon information corresponding to the at least one picture and the at least one reference picture.

Yet another advantage/feature is the apparatus having the encoder that adaptively determines the filter coefficients and the number of filters to be applied as described above, wherein the information includes at least one of motion information and disparity information corresponding to the at least one picture and the at least one reference picture.

Moreover, another advantage/feature is the apparatus having the encoder that adaptively determines the filter coefficients and the number of filters to be applied as described above, wherein the information includes at least one of intensity information and color information corresponding to the at least one picture and the at least one reference picture.

Further, another advantage/feature is the apparatus having the encoder that adaptively determines the filter coefficients and the number of filters to be applied as described above, wherein the information is obtained using at least one of a clustering method and a segmentation method.

Also, another advantage/feature is the apparatus having the encoder wherein the information is obtained using at least one a clustering method and a segmentation method as described above, wherein at least one of the clustering method and the segmentation method are based upon an Expectation-Maximization method.

Additionally, another advantage/feature is the apparatus having the encoder wherein the information is obtained using at least one a clustering method and a segmentation method as described above, wherein at least one of the clustering method and the segmentation method are based upon a Gaussian Mixture Model.

Moreover, another advantage/feature is the apparatus having the encoder as described above, wherein the encoder associates different portions of the at least one picture with a plurality of filters to capture various discrepancies in the different portions of the at least one picture.

Further, another advantage/feature is the apparatus having the encoder as described above, wherein the encoder uses at least one adaptive filter to generate at least one of integer pixels and sub-pixels for the at least one filtered reference picture.

Also, another advantage/feature is the apparatus having the encoder as described above, wherein the encoder differentially encodes filter coefficients for the adaptive filtering of the at least one reference picture based upon at least one of a spatial structure and a temporal structure of the encoder.

Additionally, another advantage/feature is the apparatus having the encoder as described above, wherein the encoder enables multiple ones of the at least one filtered reference picture, and adaptively utilizes one or more of the multiple ones of the at least one filtered reference picture on an image block-basis.

Moreover, another advantage/feature is the apparatus having the encoder as described above, wherein one or more filters used in the adaptive filtering are one of one-dimensional, two-dimensional, and three-dimensional.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder configured to encode at least one picture in a current view in a multi-view video,
wherein said encoder is configured to perform adaptive filtering of at least one reference picture in another view in the multi-view video to respectively obtain at least one filtered reference picture, and to predictively code the at least one picture using the at least one filtered reference picture, and
wherein pixels of the at least one picture are classified into different groups in response to disparity information between the at least one picture and the at least one reference picture, and each of the different groups is associated with one of a plurality of filters, the classification being responsive to disparity ranges, the at least one reference picture being a picture wherein at least one sample thereof is used for inter-prediction either of subsequent to the at least one sample being applied to an in-loop filter or in an absence of the at least one sample being applied to an in-loop filter.

2. The apparatus of claim 1, wherein said encoder adaptively determines at least one of filter coefficients and a number of filters to be applied to the at least one reference picture based upon information corresponding to the at least one picture and the at least one reference picture.

3. The apparatus of claim 2, wherein the information comprises at least one of motion information and disparity information corresponding to the at least one picture and the at least one reference picture.

4. The apparatus of claim 2, wherein the information comprises at least one of intensity information and color information corresponding to the at least one picture and the at least one reference picture.

5. The apparatus of claim 2, wherein the information is obtained using at least one of a clustering method and a segmentation method.

6. The apparatus of claim 5, wherein at least one of the clustering method and the segmentation method are based upon an Expectation-Maximization method.

7. The apparatus of claim 5, wherein at least one of the clustering method and the segmentation method are based upon a Gaussian Mixture Model.

8. The apparatus of claim 1, wherein said encoder associates different portions of the at least one picture with a plurality of filters to capture various discrepancies in the different portions of the at least one picture.

9. The apparatus of claim 1, wherein said encoder uses at least one adaptive filter to generate at least one of integer pixels and sub-pixels for the at least one filtered reference picture.

10. The apparatus of claim 1, wherein said encoder differentially encodes filter coefficients for the adaptive filtering of the at least one reference picture based upon at least one of a spatial structure and a temporal structure of the encoder.

11. The apparatus of claim 1, wherein said encoder enables multiple ones of the at least one filtered reference picture, and adaptively utilizes one or more of the multiple ones of the at least one filtered reference picture on an image block-basis.

12. The apparatus of claim 1, wherein one or more filters used in the adaptive filtering are one of one-dimensional, two-dimensional, and three-dimensional.

13. A method, comprising:
encoding at least one picture in a current view in a multi-view video using an encoder, wherein said encoding comprises performing adaptive filtering of at least one reference picture in another view in the multi-view video to respectively obtain at least one filtered reference picture, and predictively coding the at least one picture using the at least one filtered reference picture, and
wherein pixels of the at least one picture are classified into different groups in response to disparity information between the at least one picture and the at least one reference picture, and each of the different groups is associated with one of a plurality of filters, the classification being responsive to disparity ranges,
the at least one reference picture being a picture wherein at least one sample thereof is used for inter-prediction either of subsequent to the at least one sample being applied to an in-loop filter or in an absence of the at least one sample being applied to an in-loop filter.

14. The method of claim 13, wherein said encoding step comprises adaptively determining at least one of filter coefficients and a number of filters to be applied to the at least one reference picture based upon information corresponding to the at least one picture and the at least one reference picture.

15. The method of claim 14, wherein the information comprises at least one of motion information and disparity information corresponding to the at least one picture and the at least one reference picture.

16. The method of claim 14, wherein the information comprises at least one of intensity information and color information corresponding to the at least one picture and the at least one reference picture.

17. The method of claim 14, wherein the information is obtained using at least one of a clustering method and a segmentation method.

18. The method of claim 17, wherein at least one of the clustering method and the segmentation method are based upon an Expectation-Maximization method.

19. The method of claim 17, wherein at least one of the clustering method and the segmentation method are based upon a Gaussian Mixture Model.

20. The method of claim 13, wherein said encoding step comprises associating different portions of the at least one picture with a plurality of filters to capture various discrepancies in the different portions of the at least one picture.

21. The method of claim 13, wherein said encoding step uses at least one adaptive filter to generate at least one of integer pixels and sub-pixels for the at least one filtered reference picture.

22. The method of claim 13, wherein the method is performed by an encoder, and said encoding step differentially encodes filter coefficients for the adaptive filtering of the at least one reference picture based upon at least one of a spatial structure and a temporal structure of the encoder.

23. The method of claim 13, wherein said encoding step enables multiple ones of the at least one filtered reference picture, and adaptively utilizes one or more of the multiple ones of the at least one filtered reference picture on an image block-basis.

24. The method of claim 13, wherein one or more filters used in the adaptive filtering are one of one-dimensional, two-dimensional, and three-dimensional.

25. An apparatus, comprising:
a decoder configured to decode at least one picture in a current view in a multi-view video,
wherein said decoder is configured to perform adaptive filtering of at least one reference picture in another view in the multi-view video to respectively obtain at least one filtered reference picture, and to predictively decode the at least one picture using the at least one filtered reference picture, and
wherein pixels of the at least one picture are classified into different groups in response to disparity information between the at least one picture and the at least one reference picture, and each of the different groups is associated with one of a plurality of filters, the classification being responsive to disparity ranges,
the at least one reference picture being a picture wherein at least one sample thereof is used for inter-prediction either of subsequent to the at least one sample being applied to an in-loop filter or in an absence of the at least one sample being applied to an in-loop filter.

26. The apparatus of claim 25, wherein said decoder determines at least one of filter coefficients and a number of filters to be applied to the at least one reference picture based upon information corresponding to the at least one picture and the at least one reference picture.

27. The apparatus of claim 26, wherein the information comprises at least one of motion information and disparity information corresponding to the at least one picture and the at least one reference picture.

28. The apparatus of claim 26, wherein the information comprises at least one of intensity information and color information corresponding to the at least one picture and the at least one reference picture.

29. The apparatus of claim 25, wherein said decoder associates different portions of the at least one picture with a plurality of filters to capture various discrepancies in the different portions of the at least one picture.

30. The apparatus of claim 25, wherein said decoder uses at least one adaptive filter to generate at least one of integer pixels and sub-pixels for the at least one filtered reference picture.

31. The apparatus of claim 25, wherein said decoder differentially decodes filter coefficients for the adaptive filtering of the at least one reference picture based upon at least one of a spatial structure and a temporal structure of the decoder.

32. The apparatus of claim 25, wherein said decoder enables multiple ones of the at least one filtered reference picture, and adaptively utilizes one or more of the multiple ones of the at least one filtered reference picture on an image block-basis.

33. The apparatus of claim 25, wherein one or more filters used in the adaptive filtering are one of one-dimensional, two-dimensional, and three-dimensional.

34. A method, comprising:
decoding at least one picture using a decoder in a current view in a multi-view video, wherein said decoding comprises performing adaptive filtering of at least one reference picture in another view in the multi-view video to respectively obtain at least one filtered reference picture, and predictively decoding the at least one picture using the at least one filtered reference picture, and
wherein pixels of the at least one picture are classified into different groups in response to disparity information between the at least one picture and the at least one reference picture, and each of the different groups is associated with one of a plurality of filters, the classification being responsive to disparity ranges, the at least one reference picture being a picture wherein at least one sample thereof is used for inter-prediction either of subsequent to the at least one sample being applied to an in-loop filter or in an absence of the at least one sample being applied to an in-loop filter.

35. The method of claim 34, wherein said decoding step comprises determining at least one of filter coefficients and a number of filters to be applied to the at least one reference picture based upon information corresponding to the at least one picture and the at least one reference picture.

36. The method of claim 35, wherein the information comprises at least one of motion information and disparity information corresponding to the at least one picture and the at least one reference picture.

37. The method of claim 35, wherein the information comprises at least one of intensity information and color information corresponding to the at least one picture and the at least one reference picture.

38. The method of claim 34, wherein said decoding step comprises associating different portions of the at least one picture with a plurality of filters to capture various discrepancies in the different portions of the at least one picture.

39. The method of claim 34, wherein said decoding step uses at least one adaptive filter to generate at least one of integer pixels and sub-pixels for the at least one filtered reference picture.

40. The method of claim 34, wherein the method is performed by a decoder, and said decoding step comprises differentially decoding filter coefficients for the adaptive filtering of the at least one reference picture based upon at least one of a spatial structure and a temporal structure of the decoder.

41. The method of claim 34, wherein said decoding step comprises enabling multiple ones of the at least one filtered reference picture, and adaptively utilizing one or more of the multiple ones of the at least one filtered reference picture on an image block-basis.

42. The method of claim 34, wherein one or more filters used in the adaptive filtering are one of one-dimensional, two-dimensional, and three-dimensional.

43. A non-transitory storage media having video signal data encoded thereupon, comprising:

at least one picture, in a current view in a multi-view video, encoded using an encoder, wherein the at least one picture is encoded by adaptive filtering of at least one reference picture in another view in the multi-view video to respectively obtain at least one filtered reference picture, and predictive coding of the at least one picture using the at least one filtered reference picture, and wherein pixels of the at least one picture are classified into different groups in response to disparity information between the at least one picture and the at least one reference picture, and each of the different groups is associated with one of a plurality of filters, the classification being responsive to disparity ranges, the at least one reference picture being a picture wherein at least one sample thereof is used for inter-prediction either of subsequent to the at least one sample being applied to an in-loop filter or in an absence of the at least one sample being applied to an in-loop filter.

* * * * *